United States Statutory Invention Registration [19]

[11] Reg. Number: H828

Armstrong et al. [43] Published: Oct. 2, 1990

[54] HOT AIR DISINFESTATION OF FRUIT AND VEGETABLES

[75] Inventors: John W. Armstrong, Keaau; Benjamin K. S. Hu, Hilo; Steven A. Brown, Keeau; James D. Hasen, Keaau, all of Hi.

[73] Assignee: The United States of America as represented by the Secretary of Agriculture, Washington, D.C.

[21] Appl. No.: 270,608

[22] Filed: Nov. 14, 1988

[51] Int. Cl.[5] ..... A23L 3/16; A23L 1/212

[52] U.S. Cl. ..... 426/615; 426/331; 426/521

*Primary Examiner*—Robert L. Stoll
*Assistant Examiner*—Joseph D. Anthony
*Attorney, Agent, or Firm*—M. Howard Silverstein; John D. Fado; Margaret A. Connor

[57] ABSTRACT

Fruit and vegetable commodities subject to infestation by quarantine pests are disinfested so as to meet quarantine restrictions without adversely affecting the quality of the commodity. The method involves heating the commodity in hot air having a relative humidity of 30–80% until the temperature of the commodity exceeds the thermal death point temperature of the target pest but is not so high as to adversely affect commodity quality. The temperature is held at this temperature until the pest is killed. The method is effective against all life stages of quarantine pests and is suitable for large-scale commercial disinfestation of commodities for movement throught marketing channels, for example, for disinfestation of papayas of tephritid fruit flies such as the Mediterranean fruit fly, the melon fly, and the oriental fruit fly.

16 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HOT AIR DISINFESTATION OF FRUIT AND VEGETABLES

BACKGROUND OF THE INVENTION

1. Field of the Invention

This invention relates to a postharvest disinfestation treatment to ensure that fruits and vegetables are free of pests so as to meet quarantine requirements. More particularly, the present invention relates to heating fruit or vegetables with hot air under controlled conditions of relative humidity to kill all life stages of quarantine pests present in the commodity without adversely affecting the quality of the commodity.

2. Description of the Art

Certain pests are very destructive to agricultural commodities; thus quarantine restrictions are imposed to ensure that these pests are not disseminated by export of agricultural commodities which may harbor these pests to areas where the pests do not occur. Illustrative of such quarantine pests are tephritid fruit flies (Diptera: Tephritidae) such as the Mediterranean fruit fly, *Ceratitis capitata* (Wiedemann); the oriental fruit fly, *Dacus dorsalis* Hendel, and the melon fly, *Dacus cucurbitae* Coquillett. Fruit flies are among the most destructive insect pests of citrus, deciduous fruits, and vegetables. Tephritid fruit flies are present in Hawaii and have been shown to spread as larvae or eggs in fruits or vegetables shipped from infested areas. Agricultural commodities such as papayas, mangos, avocados, citrus, cucumbers, and bell peppers produced in Hawaii that may be infested with fruit flies cannot be shipped to the mainland U.S. or Japanese markets without quarantine treatment to ensure that the fruits or vegetable are free of fruit flies.

Prior to September, 1984,the standard treatment for papayas was fumigation with ethylene dibromide (EDB). Subsequent to the cancellation by the U.S. Environmental Protection Agency of the use of EDB as a food fumigant, the quarantine treatment that was adopted consisted of selecting papaya fruit of no more than quarter-ripe defined by color standard values measured with a colorimeter and then immersing the fruit in water at 42° C. for 30 minutes followed immediately by a second immersion in water at 49° C. for 20 minutes (Couey and Hayes, *Journal of Economic Entomology,* 79: 1307–1314 (1986)). The hot-water immersions are used to destroy fruit fly eggs and control postharvest decay. However, the complete treatment is limited because of the ripeness selection and because the water immersions are not sufficiently hot to kill fruit fly larvae inside the fruit.

Another quarantine procedure, called the "vapor heat treatment," uses high-temperature water-saturated vapor to raise the pulp temperature of papaya to 44.4° C. over a 6 to 8 hour period. The fruits are held at the temperature for 8.75 hours, then cooled immediately after the heating phase to below ambient temperature (APHIS, Plant Protection and Quarantine Treatment Manual, Section III, Part 9, Treatment Procedure, 1985). Although this procedure is effective against all fruit fly life stages, the treatment is time consuming and expensive. Also, scalding damage to the fruit may occur.

A modified version of the vapor heat treatment, the "quick run-up treatment," requires heating papayas with saturated water vapor until the fruit center temperature reaches 47.2° C., then immediately cooling the fruits (APHIS, CFR Amendment No. 85-19, Part 318—Hawaiian and Territorial Quarantine Notices). Although this method takes less time, elaborate facilities are still needed and some fruits may be damaged by vapor heat.

SUMMARY OF THE INVENTION

We have discovered that by carefully controlling the conditions of treatment, fruit and vegetables can be disinfested of all life stages of quarantine pests without adversely affecting the quality of these commodities. The method of the invention comprises heating a fruit or vegetable commodity in hot air under controlled conditions or relative humidity until the temperature of the commodity exceeds the thermal death point temperature of the pest but does not adversely affect the quality of the commodity. The commodity is held at this temperature until the pest is killed. Then, the commodity is cooled. Our disinfestation treatment provides a replacement method to the prior art methods that use hot water or saturated water vapor and which have the disadvantages outlined above.

The primary advantages of our method is that it is effective against all quarantine pest life stage and does not adversely affect fruit and vegetable quality such as odor, taste, appearance, ripening, texture, shelflife, or other marketable traits of the commodity.

A further advantage of the invention is that it provides a method for disinfesting an agricultural commodity of quarantine pests such as the Mediterranean fruit fly, the melon fly, and the oriental fruit fly, and thereby allow the commodity to pass through both domestic and international quarantine restrictions which have been imposed to restrict the dissemination of fruit flies.

Another advantage of the invention is that it is suitable for large-scale, commercial treatment of commodities for movement through marketing channels.

Other objects and advantages of the invention will become apparent from the ensuing description.

DETAILED DESCRIPTION OF THE INVENTION

Figure 1:
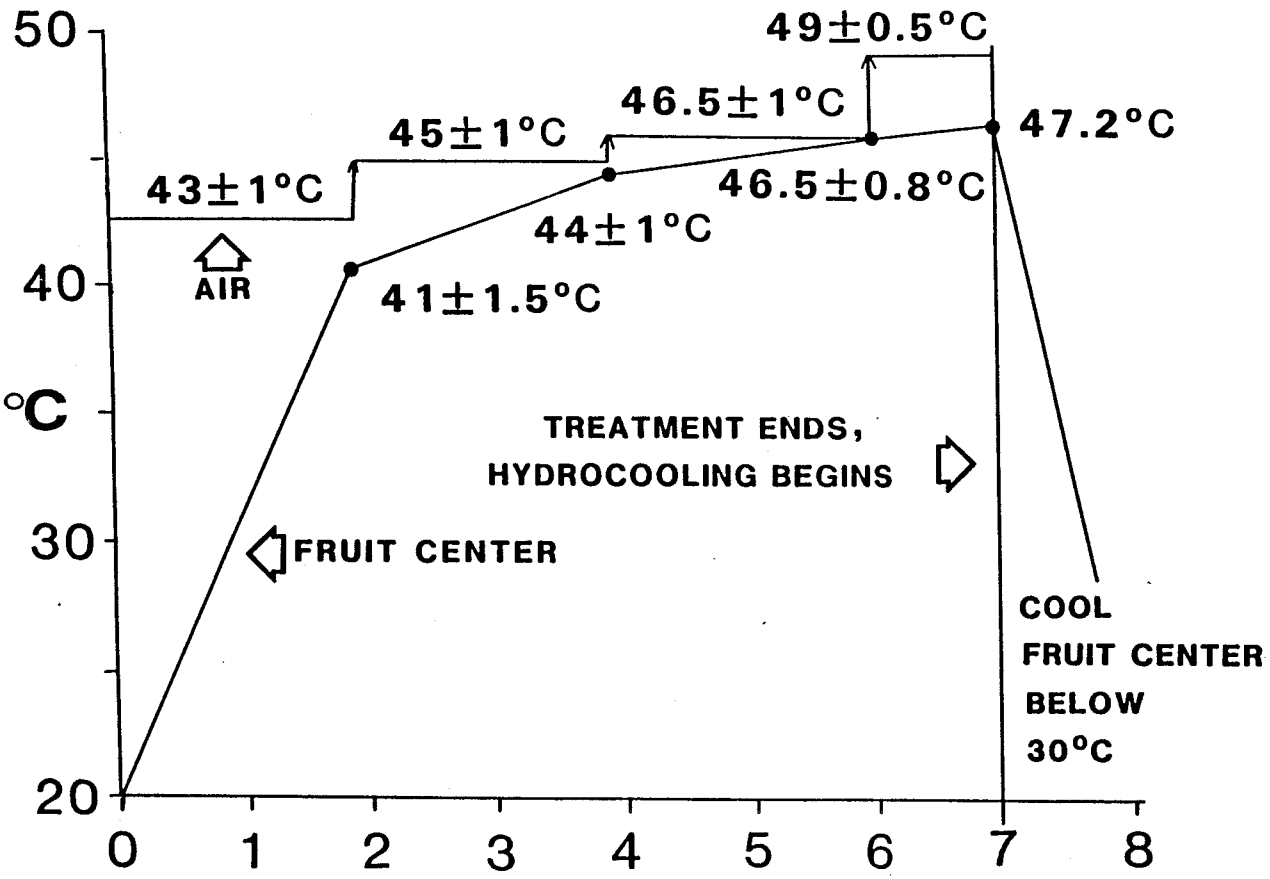
FIG. 1 shows a multiple stage treatment protocol; the air temperature, duration of each temperature stage, and fruit center temperature of treatment for papayas infested with the Mediterranean fruit fly, melon fly or oriental fruit fly are as shown; initial fruit temperatures were 14°–27° C.

The disinfestation procedure described herein is useful for killing a variety of quarantine pests including the Mediterranean fruit fly, melon fly, oriental fruit fly, mango seed weevil, Caribbean fruit fly, and Mexican fruit fly.

Major agricultural commodities which are targeted by such pests include fruits and vegetables such as papaya, mango, starfruit (carambola), atemoya, lychee, egglant, green peppers, sweet peppers, hot peppers, cucumbers, avocado, and squash.

The disinfestation treatment of the invention comprises heating a fruit or vegetable commodity in hot air under controlled conditions of relative humidity (RH)

until the temperature of the commodity exceeds the thermal death point temperature of the target pest but does not adversely affect the quality of the commodity. The commodity is held at this temperature until the pest is killed. The commodity is then cooled.

RH of the hot air during the treatment is controlled in a range such that the commodity is not desiccated and water vapor does not condense on the commodity. We have found the effective RH range to be 30–80%. For disinfestation of papaya, mango, starfuit, and atemoya, the preferred RH is 40–60%; for peppers, cucumbers, and eggplant, the preferred RH is 60–80%.

The fruit and vegetable commodity is heated for a time sufficient for the commodity to exceed the thermal death point temperature and is held at this temperature until the target pest is killed. The temperature is not raised so high as to adversely affect the quality of the fruit or vegetable commodity being treated. The thermal death point temperature of the Mediterranean fruit fly, melon fly, and oriental fruit fly is about 46.5°–47° C. Once the commodity reaches 47.2° C., these fruit flies are killed. To kill mango seed weevils, the infested commodity is heated to 48.2° C. and held at this temperature for about three hours. Any fruit flies present in the commodity will also be killed by this treatment.

The air temperature during treatment is maintained at a temperature sufficient to heat the commodity to the desired temperature without causing damage to fruit or vegetable quality, generally, in a range of about 48° to 49° C.

The specific time required to achieve the desired commodity temperature will vary depending on variables such as the starting temperature of the air, the beginning and ending commodity temperature, and the rate of heat transfer between the air and commodity. Time and temperature parameters to achieve disinfestation by our method are readily determined by trial runs.

In practice, the air temperature is gradually increased over time until the average commodity center temperature exceeds the thermal death point temperature of the target pest. For fruit with multiple small seeds such as papaya a atemoya, the fruit center temperature (FTC) is measured. For fruit or vegetables with a large centrally located seed such as mango and avocado, the temperature at the seed surface is measured. For fruit or vegetable such as peppers, the temperature of the pulp is measured.

The treatment may be carried out in a multiple stage treatment as described in detail below in Examples 1 and 3 and shown in FIG. 1. The treatment may also be carried out in a single stage treatment as described in detail below in Example 2 and shown in FIG. 2.

Subsequent to heating in accordance with the invention, the commodity is cooled, preferably to below about 30° C. The preferred cooling methods are hydrocooling and forced-air cooling.

The treatment of the invention is suitable for large-scale, commercial disinfestation of commodities for movement through marketing channels. As a practical mater, the large-scale treatment comprises a closed system wherein air is heated, humidified to the desired RH, and forced over the surface of the commodity and then recirculated.

With our method, the probit 9 quarantine security standard can be met. This standard provides quarantine security by allowing a survival probability of no more than 3.2 survivors from an estimated treated population of 100,000 at the 95% confidence level.

The following examples illustrate the invention.

EXAMPLE 1

Fruit Infestation. Mediterranean fruit flies, melon files, and oriental fruit flies were obtained from the USDA-ARS Tropical Fruit and Vegetable Research Laboratory fruit fly rearing facility, Honolulu, Hi. They were reared as described by Chambers et al., pp. 99–102, and Tanaka et al., pp. 19–24, *Proc. Panel Sterile-Male Technique for Control of Fruit Flies,* IAEA, Vienna, Austria (1970).

'Solo' papayas used for infestation were obtained from the Puna District on the island of Hawaii. Fruit maturity was determined according to the Hawaii Papaya Ripening Chart (Papaya Administrative Committee, 1100 Ward Avenue, Room 860, Honolulu, Hi. 96814) and ranged from color break (tinge of yellow at the blossom end) to one-half ripe. Only firm, undamaged fruit were selected for infestation and treatment because damaged, decayed or soft, overripe papayas would be culled before treatment under commercial conditions. After infestation papayas with evidence of softening or deterioration from advanced ripening and larval activity or handling were discarded. These fruit were mushy, leaked juices, or showed postharvest decay, such as *Collectotrichum gloeosporioides* (Penzig) Saccardo, *Phytophthora palmivora* Butler, and *Rhizopus stolonifer* (Ehrenberg ex. Fries) Lind.

To infest a papaya, the fruit surface was wiped with ethanol. A flamed cork borer was used to remove a 1.2-cm-diameter plug from the equatorial side. After removing any attached seeds and placental bundle material from the interior end, the plugs measured 1.2 to 2.1-cm long ($\bar{x} \pm SE = 1.6 \pm 0.2$ cm).

Mediterranean fruit fly, melon fly or oriental fruit fly eggs (1–18 hours old) were collected with an egging device (Hart and Miyabara, *Journal of Economic Entomology* 61: 881 (1968)). About 150 eggs were applied onto the interior end of each plug with a fine-tipped paintbrush. The infested plugs were replaced into the holes and secured with a 25-em$^2$ piece of masking tape. To obtain infestations of Mediterranean fruit fly, melon fly or oriental fruit fly first instars, papayas infested with eggs were held for 24 hours before treatment to allow eggs to hatch. Egg viability was verified by holding a portion of the eggs on water-moistened blotter paper in a petri dish.

Third instars for infestation were obtained by placing Mediterranean fruit fly, melon fly or oriental fruit fly eggs onto wet larval diet (Chambers et al, and Tanaka et al., supra) in 2-cm-deep trays. After five days incubation at 24°±1° C., third instars were extracted by mixing the diet with a saturated sugar-water solution. Larvae were collected that floated to the surface of the slurry. Third instars used in the tests were primarily feeding. Some larvae were non-feeding or "popping" (Armstrong et al., *Journal of Economic Entomology* 77:553–555 (1984)). Approximately 100 third instars were placed into the bored hole in each papaya. The plug for each hole was replaced.

Treatment Boxes. Heat-resistant-plastic, stackable boxes (38 cam wide by 20 cm high by 58 cm long) that had open lattice bottoms (1-cm$^2$ holes with 2-mm-thick walls) and solid, unventilated sides were used in all tests. The treatment boxes held and single layer of papayas (11.5±1.5 kg) arranged blossom end up. The stacked treatment boxes formed a vertical "wind tunnel" through which heated air was forces over the fruit.

Monitoring Temperature, RH, and Air Velocity. Air temperatures and FCT were measured throughout each treatment test with thermistors and recorded with an Omnidata model 516C "Polycorder" (Omnidata International, Inc., Logan, Utah 84321). Thermistor temperature probes were Omnidata model TP10with Fenwal UUT-51J1 100,000 ohm precision thermistors, accurate to 35 0.25° C. without calibration. Temperature monitoring equipment was calibrated periodically at 0° C. and 48° C., Thermistor temperature probes consisted of a tip (2.0 cm long by 0.5-cm diameter) and an attached base (5.0 cm long by 8.0-mm diameter) and were designed to monitor heat only at he distal surface of the probe tip.

Thermistors measuring air temperatures in the air space above the papayas in treatment boxes were held in place with masking tape. Thermistors measuring papaya FCT were inserted into the blossom end through a hold made by pushing a metal rod 0.05-cm in diameter into the blossom end to the seed cavity. The probe tip was at the center of the seed cavity, and the base of the probe protruded from the blossom end. The base of the probe was secured with masking tape forming a plug that prevented air leakage around the probe. The largest papayas in every test were used to monitor FCT to ensure that all fruit reached the desired FCT.

RH was measured during the treatments with a model 3309-50 LCD digital hygrometer and sensor (Cole Parmer Instrument Company, Chicago, Ill. 60648) and capable of 35 2% accuracy.

The entry and exit air velocities were measured with a TSI Model No. 1650 air velocity meter (TSI, Inc., St. Paul, Minn. 55164).

Efficacy Tests. Six treatment boxes containing infested papayas were stacked in two lengthwise-abutting columns of three boxes each on a wooden stand built from lumber (5.0 cm wide by 10.2 cm long). The stand, which resembled a table without a top, provided an unobstructed airflow by elevating the box columns 32 cm above the floor in the center of a 12.1-meter$^2$ walk-in environmental room with attached heat pump and circular-caged fan for heating and air circulation, respectively (Forma Scientific, Marietta, Ohio 45750). A plywood (0.64-cm thick) box (78.7 cam wide by 61.0 cm long by 61.0 cm high) that had a top and open bottom, was placed over the two columns of treatment boxes. A venturi exhaust fan (30.5 cm wide, four blade, 1/30 hp, model No. 46361A, Dayton Electric Manufacturing, Chicago, Ill. 60648), capable of moving 20.67 m$^3$/min of air with no backpressure at 1550 rpm, was fitted over a 33.0-cm-diameter hole cut in the top center of the plywood box. The fan pulled air in at the bottom and up through the two columns of treatment boxes, and out into the room. The entry velocity of air into the bottom treatment boxes was $\bar{x}\pm SEM=0.71\pm0.04$ m/sec and the exit velocity from the top treatment boxes was $\bar{x}\pm SEM=0.94\pm0.09$ m/sec. The higher exit velocity was caused by the venturi effect of the fan.

The air in the room was heated and recirculated by a heatpump (Forma Scientific, Marietta, Ohio 45750). Air temperatures during the treatment tests were manually adjusted using thermostatic controls.

FIG. 1 shows the four air temperature stages and stage durations tested for efficacy in disinfesting papayas of Mediterranean fruit fly, melon fly or oriental fruit fly. The stage 1, initial air temperature was 43°±1° C. for 2 hours or until the FCT equilibrated to 41°±1.5° C.; stage 2, 45°±1° C. for 2 hours or until the FCT equilibrated to 44°±1° C.; stage 3, 45,5°±1° C. for 2 hours or until the FCT was 46.5°±0.8° C.; and stage 4, 49°±0.05° C. for <1 hour until all FCT were ≧47.2° C., but never exceeding 47,8° C. The initial fruit temperatures were 14°-27° C. The RH during treatment was 40-60%.

The papayas were hydrocooled immediately after treatment by immersion in a continuous flow of tap water (20°±5° C.) in containers (40 cm wide by 24 cm high by 60 cm long) until the FCT were 30° C. or below.

A portion (about 15% by weight) of the infested papayas for each efficacy test were held for controls and the remainder were treated.

Survival Tests. To determine the FCT at which a treatment (FIG. 1) failed to kill Mediterranean fruit fly, melon fly or oriental fruit fly eggs and larvae, infested papayas were treated until the FCT reached 43.2°, 45.2°, or 46.2° C., and then hydrocooled. Four treatment boxes containing infested papayas were stacked in the center of the environmental room used for the efficacy tests. The bottom box rested about 30 cm above the floor on two cement blocks to provide unobstructed air flow out of the bottom of the stack. Hot air from the heat pump was forced by the circular-caged fan through a 15-cm-diameter pipe that opened 0.5 m above the top box of the stack. The heated air was forced downward through the stacked boxes at an average entry velocity of $\bar{x}\pm SEM=3.23\pm1.98$ m/sec and an average exit velocity of $\bar{x}\pm SEM=0.92\ \pm0.62$ m/sec. The same treatment regimen (FIG. 1) for the efficacy tests were used in the survival tests except that the papayas were hydrocooled when the FCT equilibrated to 43.2°, 45.2° or 46.2° C.

A portion (about 15% by weight) of the infested papayas for each survival test was held for controls and the remainder were treated.

Post-treatment Holding Conditions. The treated and control fruits efficacy and survival tests were placed separately on trays containing 0.8-1.0 kg or dry larval rearing diet (Chambers et al., and Tanaka et al., supra) and examined two weeks later (Armstrong et al., supra). All remaining papaya debris was thoroughly inspected for remaining insects. The criterion used to determine survival was adult emergence. Uneclosed pupae were dissected to determine if they were alive.

Data Analysis. Populations were estimated by dividing the number of pupae from the controls by weight of the control fruit, and multiplying the quotient by the weight of the treated fruit (Armstrong et al., supra).

The upper 95% confidence level (CL) for survival was obtained from tables of the Poisson distribution (Couey and Chew, *Journal of Economic Entomology* 79: 887-890 (1986)). The probit 9 (Baker, USDA Circular No. 551 (1939)) standard was used to evaluate the effectiveness of the treatment of papayas against Mediterranean fruit fly, melon fly, and oriental fruit fly eggs and first and third instars.

Percent survival was arcsine transformed, then analyzed by analysis of variance (SAS Institute, *SAS User's Guide: Statisics,* SAS Institute, Cary, N.C. (1982)) and Duncan's multiple range test (Duncan, *Va. J. Sci.* 2: 171-189 (1951)) to determine significant differences in survival among the three fruit fly species and their life stages.

Phytotoxicity Tests. Uninfested papayas were treated the same as those in the efficacy tests, until FCT ≧47.2°, but never exceeding 47.8° C. to determine if the treatment caused fruit damage (phytotoxicity). The ripeness stages tested were mature green, colorbreak, one-fourth ripe, and on-half ripe.

The papayas were held in the laboratory for 24 hours at ambient temperatures (21°±2° C.) treatment and hydrocooling. This allowed the fruit to recover from any physiological disruption of the ethylene enzyme ripening system caused by the heat treatment. The papayas were then treated with a 400 ppm aqueous solution of 2,4-thiazolyl)benzimidazole funigicide (Decco Salt Number 19, Pennwalt Corp., Monrovia, Calif. 91016) to simulate industry fruit waxing/decay control procedures. The fungicide was applied with an aerosol spray bottle and rubbed over the fruit surface by hand.

The treated and control papayas were placed unwrapped in 9.1-kg-capacity fiberboard shipping cartons (18 cm deep by 49 cm long by 39 cm wide) and held for 7 days at 10° C. This procedure simulated shipping and storage conditions before ripening at room temperature (21°±2° C.). Fourteen replications using a total of 760 uninfested papayas were treated, refrigerated, and ripened.

Ripened papayas were observed for external and internal disease and skin scalding. They were inspected for "hard shell," fruit with ripe interiors and a shell of up to about 2 cm thickness of nonripening flesh beneath the skin, and "hard spots," internal nodules of unripened flesh in ripe fruit. These identifiable symptoms of heat injury are identical to chilling injury in papayas.

Efficacy Tests. Table 1 shows the results of the treatments of papayas infested with Mediterranean fruit fly, melon fly or oriental fruit fly eggs, first or third instars. The estimated treated population of Mediterranean fruit fly, melon fly or oriental fruit fly and first and third instars were combined for each fruit fly species to determine the total estimated treated populations. The treated fruits contained infestations far in excess of the normal field infestation rates for mature green to one-half-ripe papaya (Couey and Hayes, supra). On Mediterranean fruit fly survived from an estimated treated population of 328,071. One melon fly survived from an estimated treated population of 329,984. One oriental fruit fly survived from an estimated treated population of 322,918. The quarantine security standard is probit 9. The results of the treatments (Table 1) using the air temperature and stage durations given in FIG. 1 for a final FCT of 47.2° C. exceeded the probit 2 standard of 3.2 survivors from an estimated treated population of 100,000 for all three fruit fly species tested. Only 1.46 Mediterranean fruit flies, 1.46 melon flies, and 1.49 oriental fruit flies survived from an estimated treated population of 100,000 at the 95% CL.

TABLE 1

Survival of three tephritid fruit fly species in papayas treated until fruit center temperatures equilibrated at 47.2° C.

| Species and life stage | No. rep. | Fruit wt (kg) Control | Fruit wt (kg) Treated | No. survivors Control | No. survivors Treated | Pop. est.[a] | Pop. surviving per 100,000 | Upper 95% CL[b] No. | Upper 95% CL[b] Proportion per 100,000 |
|---|---|---|---|---|---|---|---|---|---|
| Mediterranean fruit fly | | | | | | | | | |
| Egg | 12 | 67.48 | 361.54 | 23,356 | 0 | 121,233 | — | — | — |
| First instar | 6 | 35.63 | 187.25 | 15,340 | 1 | 83,544 | — | — | — |
| Third instar | 11 | 86.21 | 472.71 | 21,159 | 0 | 123,294 | — | — | — |
| TOTAL | 29 | 189.32 | 1,021.50 | 59,855 | 1 | 328,071 | 0.31 | 4.8 | 1.46 |
| Melon fly | | | | | | | | | |
| Egg | 9 | 47.38 | 266.93 | 23,186 | 1 | 139,290 | — | — | — |
| First instar | 6 | 40.25 | 235.67 | 20,579 | 0 | 111,949 | — | — | — |
| Third instar | 13 | 78.16 | 360.70 | 18,661 | 0 | 78,745 | — | — | — |
| TOTAL | 28 | 165.79 | 863.30 | 62,426 | 1 | 329,984 | 0.30 | 4.8 | 1.46 |
| Oriental fruit fly | | | | | | | | | |
| Egg | 10 | 44.37 | 255.29 | 18,455 | 0 | 99,224 | — | — | — |
| First instar | 6 | 35.29 | 173.44 | 14,286 | 1 | 81,117 | — | — | — |
| Third instar | 14 | 80.25 | 638.45 | 19,656 | 0 | 142,577 | — | — | — |
| TOTAL | 30 | 159.91 | 1,067.18 | 52,397 | 1 | 322,918 | 0.31 | 4.8 | 1.49 |

[a]The estimated population for each replication was calculated and the values summed.
[b]Derived from the one-tailed confidence levels based on the Poisson distribution by using the number (survivors of treatment) at the 0.95% CL divided by the population estimate and multiplying the quotient by 100,000.

The eggs and first instars, which usually occur nearer to the fruit surface in nature, were located in our tests nearer to the seed cavity where third instars often occur. Egg and first instar infestations near the seed cavity simulated the worst possible case to develop efficacy data for quarantine treatments for papayas. Seo et al. (*Journal of Economic Entomology* 67: 240–242 (1974) suggested from their research on vapor heat that temperatures at a fruit depth of 2 cm are the most important for heat treatments against oriental fruit fly eggs and larvae. Mediterranean fruit fly, melon fly, and oriental fruit fly eggs under natural conditions would be found close to the surface of fruit at a depth of <1.0 cam because the lengths of the ovipositors are 3.2±0.12, 5.6±0.20, and 4.5±0.12 mm ($\bar{x}$±SE) for Mediterranean fruit fly, melon fly, and oriental fruit fly, respectively.

Survival Tests. Table 2 shows the results of survival tests with eggs, first and third instars from treated papayas with lower final FCT than 47.2° C. The survival of eggs, first and third instars at 43.2°, 45.2° and 46.2° C. is highly variable (Table 2) with little or no survival occurring beyond constant treatment times between 45.2 and 46.2° C. for melon fly and oriental fruit fly (Table 2), and between 46.2° and 47.2° C. (Tables 1 and 2) for the Mediterranean fruit fly.

Survival test results (Table 2) indicate the egg and first instars were the least susceptible life stages to hot air treatment for all three fruit fly species. Oriental fruit fly third instars had a greater percentage survival than first instars at 45.2° C. Melon fly third instars had a higher percentage survival than eggs first instars at 46.2° C. However, these percentage survival differences were not statistically significant. Lower susceptibility to hot air treatment by eggs and first instars compared with third instars is further supported by the efficacy test data. Only one Mediterranean fruit fly and one oriental fruit fly first instar, and one melon fly egg survived treatment (FCT at 47.2° C., Table 1). The largest papayas in every test were used to monitor FCT to ensure that all fruit reached the desired FCT.

TABLE 2

Survival of three tephritid fruit fly species in papayas until fruit center temperatures equilibrated at 43.2, 45.2 or 46.2° C.

| Species and life stages | No. rep. | Control Fruit wt. (kg) | Control No. survivors | 43.2° C. Fruit wt. (kg) | 43.2° C. Est. pop.[a] | 43.2° C. Survivors No. | 43.2° C. Survivors % (X ± SEM) |
|---|---|---|---|---|---|---|---|
| Mediterranean fruit fly | | | | | | | |
| Egg | 3 | 20.46 | 9,093 | 36.75 | 16,658 | 4,166 | 24.09 ± 6.48 |
| First instar | 3 | 22.00 | 9,408 | 35.68 | 14,584 | 3,881 | 33.10 ± 9.46 |
| Third instar | 4 | 34.27 | 7,814 | 42.93 | 10,742 | 1,419 | 19.17 ± 8.62 |
| Melon fly | | | | | | | |
| Egg | 3 | 18.58 | 9,936 | 33.37 | 15,926 | 2,335 | 17.66 ± 3.82 |
| First instar | 3 | 22.90 | 12,912 | 33.18 | 19,059 | 2,149 | 10.68 ± 5.50 |
| Third instar | 5 | 23.48 | 7,320 | 29.70[b] | 14,036[b] | 820[b] | 7.17 ± 5.91[b] |
| Oriental fruit fly | | | | | | | |
| Egg | 3 | 18.43 | 10,364 | 30.71 | 18,272 | 7,281 | 39.95 ± 12.23 |
| First instar | 3 | 16.84 | 5,139 | 33.53 | 9,995 | 1,884 | 20.25 ± 7.63 |
| Third instar | 4 | 23.47 | 20,631 | 42.08 | 8,902 | 1,331 | 20.96 ± 12.11 |

| Species and life stages | No. rep. | 45.2° C. Fruit wt. (kg) | 45.2° C. Est. pop.[a] | 45.2° C. Surviviors No. | 45.2° C. Surviviors % (X ± SEM) | 46.2° C. Fruit wt. (kg) | 46.2° C. Est. pop.[a] | 46.2° C. Survivors No. | 46.2° C. Survivors % (X ± SEM) |
|---|---|---|---|---|---|---|---|---|---|
| Mediterranean fruit fly | | | | | | | | | |
| Egg | 3 | 34.48 | 15,632 | 4,360 | 27.78 ± 12.10 | 32.15 | 16,357 | 129 | 0.83 ± 0.76 |
| First instar | 3 | 35.58 | 15,139 | 866 | 7.22 ± 3.27 | 32.76 | 13,731 | 37 | 0.73 ± 0.73 |
| Third instar | 4 | 40.25 | 10,181 | 32 | 0.26 ± 0.13 | 41.83 | 10,422 | 1 | 0.00[c] ± 0.00 |
| Melon fly | | | | | | | | | |
| Egg | 3 | 31.41 | 15,422 | 151 | 2.10 ± 1.47 | 33.37 | 15,871 | 0 | 0.00[c] ± 0.00 |
| First instar | 3 | 32.75 | 18,606 | 1,222 | 4.72 ± 2.95 | 33.07 | 18,722 | 0 | 0.00[c] ± 0.00 |
| Third instar | 5 | 42.18 | 14,855 | 97 | 1.19 ± 0.73 | 41.01 | 14,740 | 1 | 0.00[c] ± 0.00 |
| Oriental fruit fly | | | | | | | | | |
| Egg | 3 | 32.44 | 19,515 | 3,061 | 16.90 ± 6.68 | 31.94 | 19,399 | 3 | 0.01 ± 0.01 |
| First instar | 3 | 34.31 | 10,070 | 233 | 2.14 ± 0.52 | 35.77 | 10,631 | 0 | 0.00[c] ± 0.00 |
| Third instar | 4 | 42.20 | 8,920 | 317 | 7.41 ± 7.25 | 42.07 | 9,067 | 1 | 0.01 ± 0.01 |

[a]The estimated population for each replication was calculated and the values summed.
[b]Four replications
[c]$0.000 < X < 0.010$ All the fruit in that treatment can be ensured of final FCT ≧47.2° C. if the largest papayas in a treatment were selected for temperature monitoring.

Phytoxicity Tests. The treatment of papaya in accordance with the method of the invention did not adversely affect fruit quality. Our data indicate the treatment of the invention maintains better fruit quality than either the hot water immersion or "quick run-up treatment" of the prior art described above. These prior art treatments have caused damage exceeding 25% (H. M. Couey unpublished data, R. A. Souza personal communication). Papayas treated in accordance with the method of the invention showed no evidence of external scalding. Only 12 papayas from the 760 fruits treated were unmarketable following refrigerated storage and ripening. Only 0.04% of the papayas had internal heat damage in the form of hard spots. This damage was well below that caused by either of the two other quarantine heat treatments. Nine papayas had stem-end or body rot decay caused by one or more postharvest decay organisms including *C. gloeosporioides,* P. palmivora and *R. stolonifer.*

The marketable papayas (784) exhibited no evidence of aberrant ripening regardless of the ripeness stage at which they were treated. The fruit did retain the sweetness and flavor characteristic of papaya; however, the characteristic odor of papaya was not as strong in the treated fruit as in the controls.

The dew point, the point at which water vapor begins to condense, may be the best method to control RH during treatment. Controlling RH can prevent damage caused by moisture condensation on the fruit at high RH (Jones, *Proc. Amer. Soc. Hort. Sci.* 37: 700–705 (1939)) and by moisture loss from the fruit at low RH. Maintaining the dew point temperature of the air higher than the dew point temperature of the fruit prevents the moisture condensation onto the fruit surface that occurs during vapor heat treatment. Maintaining 40–60% RH during the treatment of papayas minimizes moisture and weight loss from the fruit that occurs at <40% RH.

EXAMPLE 2

Figure 2:
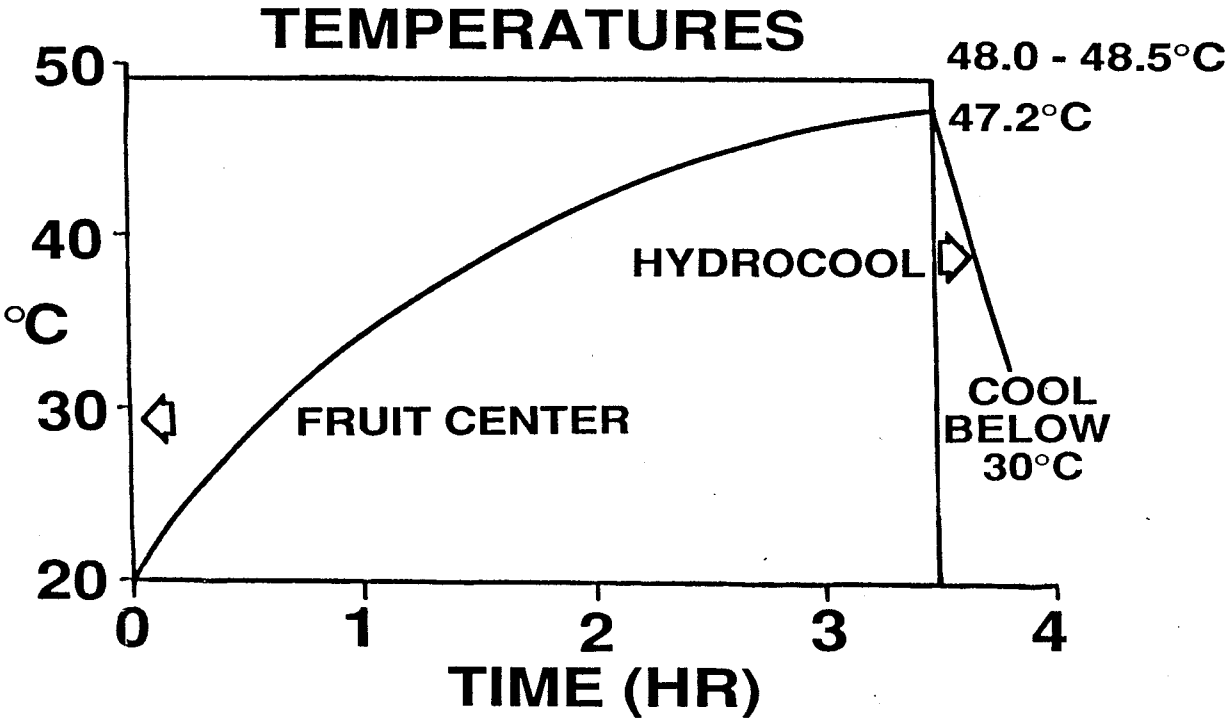
FIG. 2 shows a single stage treatment protocol; papayas were heated at 48.0°–48.5° C. until the fruit center temperature of the papayas reached 47.2° C.; initial fruit temperatures were 14°–27° C.

Papaya were treated in a single stage treatment by heating the fruit using a single air temperature of 48.0°–48.5° C. until the FTC was 47.2° C. (FIG. 2). The time to attain the desired FTC was 3.5 hours. RH during treatment was 40–60%. The initial fruit temperatures were 14°–27°C. Immediately following treatment, the papaya were cooled to below 30° C. by hydrocolling. The fruit infestation procedure, treatment boxes, monitoring procedures, efficacy tests, survival tests, and phytotoxicity tests were as described in Example 1.

Treatment by this protocol resulted in papaya that met the probit 9 quarantine security standard. Fruit quality was excellent.

EXAMPLE 3

Atemoya were treated using a two-stage treatment consisting of heating with hot air having an RH of 40–60%. In the first stage, the fruit was heated to FCT of 45.5° C. (46.0° C. air for 4.0 hours); in the second stage, the fruit was heated to a FCT of 47.2° C. (48.0° C. air for 1.5 hours). The fruit was cooled by hydrocooling.

This treatment was effective in killing all stages of fruit flies in the fruit. Fruit quality was excellent.

EXAMPLE 4

Mangos were treated to kill any infestations of mango seed weevil. The treatment consisted of heating the mangos with hot air (48.5°–49.0° C.) having an RH of 40–60% until the seed surface temperature was 48.2° C., and holding the mangos at a seed surface temperature of 48.2° C. for 3 hours.

This treatment protocol was effective in killing mango seed weevils and fruit flies. Fruit quality was excellent.

It is understood that the foregoing detailed description is given merely by way of illustration and that modifications and variations may be made therein without departing from the spirit and scope of the invention.

We claim:

1. A treatment method for disinfesting a fruit or vegetable commodity of a quarantine pest, which comprises heating the commodity in one or more stages with air having a temperature of about 43° to 49° C. and a relative humidity (RH) of 30–80% until the temperature of the commodity exceeds the thermal death point temperature of the pest but does not cause external scalding of the commodity and holding the commodity at this temperature until the pest is killed.

2. The method of claim 1 which further includes cooling the heated commodity.

3. The method of claim 1 wherein the commodity is selected from the group consisting of papaya, mango, starfruit, atemoya, lychee, eggplant, pepper, cucumber, and squash.

4. The method of claim 1 wherein the quarantine pest is the Mediterranean fruit fly, melon fly, oriental fruit fly or mango seed weevil.

5. The method of claim 1 wherein said RH of the air is 40–60% and said heating is carried out in one stage, said stage comprising heating the commodity until the temperature of the commodity is 47.2° C.

6. The method of claim 5 wherein the commodity is papayas.

7. The method of claim 5 which further includes immediately cooling the heated commodity to below about 30° C.

8. The method of claim 1 wherein the temperature of said air is about 48° to 49° C.

9. The method of claim 1 wherein the commodity is papayas, said RH of said air is 40–60%, and said heating is carried out in first, second, third, and fourth stages, said first stage comprising heating the papayas until the fruit center temperature (FTC) is about 41° C.; said second stage comprising heating the papayas until the FTC is about 44° C.; said third stage comprising heating the papayas until the FTC is about 46.5° C.; and said fourth stage comprising heating the papayas until the FTC is 47.2° C.

10. The method of claim 9 which further includes immediately cooling the papayas to below about 30° C. after said fourth stage heating.

11. The method of claim 1 wherein the commodity is atemoya, said RH of said air is 40–60%, and said heating is carried out in first and second stages, said first stage comprising heating the atemoya until the FTC is about 45.5° C. and said second stage comprising heating the atemoya until the FTC is 47.2° C.

12. The method of claim 11 which further includes immediately cooling the atemoya to below about 30° C. after said second stage heating.

13. The method of claim 1 wherein the commodity is mangos, said RH of the air is 40–60% said heating is carried out in one stage comprising heating the mangos until the temperature at the seed surface is 48.2° C., and said holding is for three hours.

14. The method of claim 13 which further includes immediately cooling the mangos to below about 30° C. after said holding.

15. A method for disinfesting papayas of the Mediterranean fruit fly, melon fly, or oriental fruit fly, which comprises heating the papayas in air having a relative humidity of 40–60% and a temperature of about 48°–49° C. until the fruit center temperature of the papayas is 47.2° C., and immediately cooling the heated papayas to below about 30° C.

16. A method for disinfesting papayas of the Mediterranean fruit fly, melon fly, or oriental fruit fly, which comprises heating the papayas in first, second, third, and fourth stages in air having a temperature of about 43° to 49° C. and a relative humidity of 40–60%, said first stage comprising heating the papayas in air having a temperature of about 43° C. until the fruit center temperature (FTC) is about 41° C.; said second stage comprising heating the papayas in air having a temperature of about 45° C. until the FTC is about 44° C.; said third stage comprising heating the papayas in air having a temperature of about 46.5° C. until the FTC is about 46.5° C.; and said fourth stage comprising heating the papayas in air having a temperature of about 49° C. until the FTC is 47.2° C., and immediately cooling the heated papayas to below about 30° C.

* * * * *